(12) United States Patent
Kaiho et al.

(10) Patent No.: US 6,515,450 B1
(45) Date of Patent: Feb. 4, 2003

(54) INTERNAL BATTERY HOLDING STRUCTURE IN MOBILE EQUIPMENT

(75) Inventors: Takashi Kaiho, Yokohama (JP); Yasunobu Ikeda, Yokohama (JP); Kanta Judai, Yokohama (JP); Takeshi Sato, Yokohama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 109 days.

(21) Appl. No.: 09/980,349

(22) PCT Filed: Apr. 3, 2001

(86) PCT No.: PCT/JP01/02892

§ 371 (c)(1),
(2), (4) Date: Feb. 13, 2002

(87) PCT Pub. No.: WO01/75988

PCT Pub. Date: Oct. 11, 2001

(30) Foreign Application Priority Data

Mar. 3, 2000 (JP) ........................................ 2000-100875

(51) Int. Cl.[7] ............................................. H01M 10/46
(52) U.S. Cl. ..................................................... 320/112
(58) Field of Search ................................. 320/107, 110, 320/112, 113, 114, 115; D13/103, 107, 108; 429/96–100; 307/150

(56) References Cited

U.S. PATENT DOCUMENTS

| 5,457,376 | A | * | 10/1995 | Chong et al. |
| 5,825,158 | A | * | 10/1998 | Wei |
| 5,905,632 | A | | 5/1999 | Seto et al. |
| 5,933,330 | A | | 8/1999 | Beutler et al. |

FOREIGN PATENT DOCUMENTS

| EP | 0 712 226 | 5/1996 |
| GB | 2 325 696 | 12/1998 |

* cited by examiner

Primary Examiner—Edward H. Tso
(74) Attorney, Agent, or Firm—Pearne & Gordon LLP

(57) ABSTRACT

An internal battery (2) has a battery terminal provided on a tip and has a third engagement projection (11) provided on the other end in a vertical direction. A battery housing portion (4) has a connector (5) provided on a tip and has, on a rear end, a battery hook (6) for pressing the third engagement projection (11) interlockingly with a sliding operation from a release position to a lock position. The battery hook (6) is slid from the release position to the lock position to press the third engagement projection (11). Consequently, the battery terminal is caused to abut on the connector (5) and the internal battery 2 is fixed into the battery housing portion (4). A battery (3) is fixed and attachment is thus completed.

6 Claims, 8 Drawing Sheets

INTERNAL BATTERY HOLDING STRUCTURE IN MOBILE EQUIPMENT

This application claims the benefit of International Application Number PCT/JP01/02892, which was published in English on Oct. 11, 2001.

TECHNICAL FIELD

The present invention relates to mobile equipment such as a mobile telephone, and more particularly to a holding structure for an internal battery which can be attached and removed.

BACKGROUND ART

Figure 8:
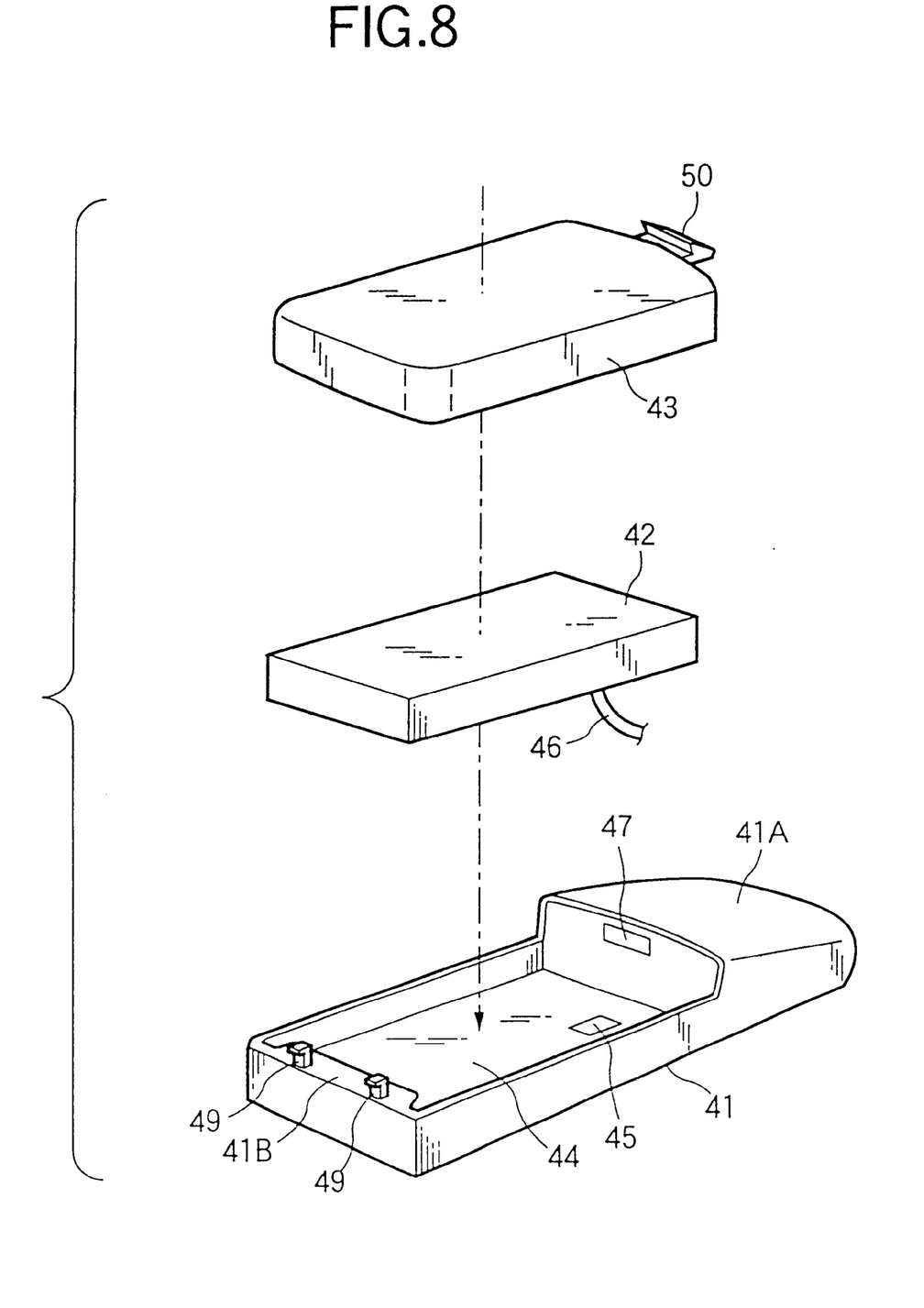
FIG. 8 is a perspective view showing a conventional internal battery holding structure.

Conventionally, there has been a holding structure for an internal battery which can be attached and removed as shown in FIG. 8. As shown in FIG. 8, an internal battery 42 is accommodated in a battery housing portion 44 concaved on a rear case 41 of a mobile telephone, and a battery cover 43 is then attached to the rear case 41 from above. Thus, the internal battery 42 is built in the mobile telephone. In the following description, a longitudinal direction of the rear case 41 is referred to as a vertical direction, a direction which is orthogonal to the longitudinal direction of the rear case 41 along a bottom face of the battery housing portion 44 is referred to as a transverse direction, and a direction which is perpendicular to the bottom face of the battery housing portion 44 is referred to as a height direction. Moreover, the side turned upward during the use of the mobile telephone is referred to as a front portion and the side turned downward is referred to as a rear portion.

The battery housing portion 44 is concaved to have the shape of an almost rectangular parallelepiped over the surface of the rear case 41. A bottom face is provided with a connector opening 45 and an internal wall surface on a front end is provided with one fitting hole 47. Moreover, a pair of second engagement projections 49 are provided in a rear edge portion 41B of the rear case 41. The internal battery 42 has the external shape of an almost rectangular parallelepiped. When the internal battery 42 is accommodated in the battery housing portion 44, a wire 46 is led out in an optional position. A fitting projection 50 is provided on the front end of the battery cover 43 and a pair of ribs (not shown) to be engaged with the second engagement projections 49 are provided on the back face of the rear edge portion.

In the mobile telephone having such a structure, first of all, the wire 46 of the internal battery 42 is connected to a connector provided in the connector opening 45, and a cable of the wire 46 and the internal battery 42 are accommodated in the battery housing portion 44. Next, a fitting projection 50 on the tip of the battery cover 43 is opposed to the fitting hole 47 provided on the front end of the battery housing portion 44 and the battery cover 43 is slid forward and is thus attached to the rear case 41.

Figure 9:
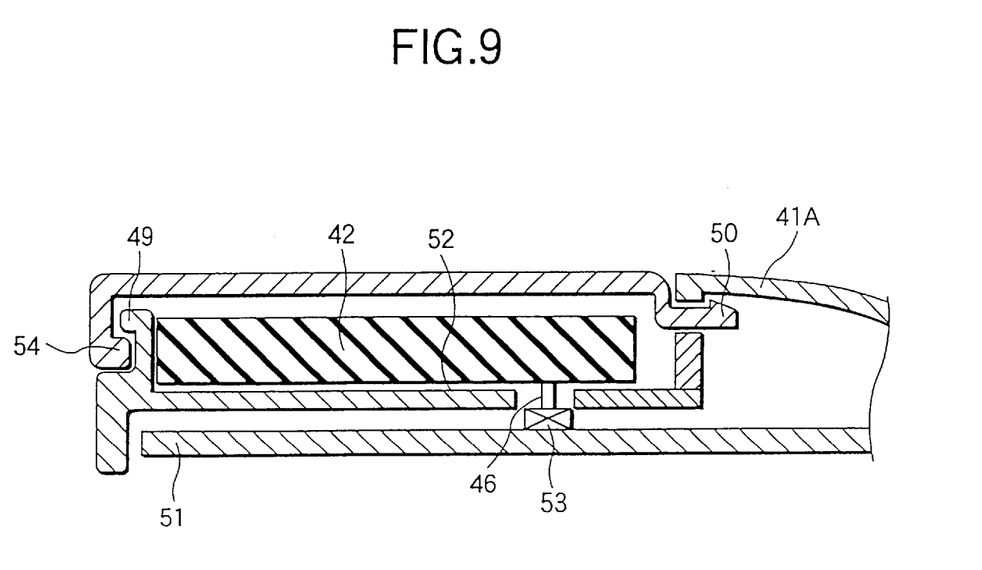
FIG. 9 is a sectional view showing the conventional internal battery holding structure.

FIG. 9 is a sectional view showing a state in which the attachment is completed. As shown in FIG. 9, the wire 46 led out of the internal battery 42 is connected to a connector 53 provided on a printed circuit board 51 and the power of the internal battery 42 is supplied to each portion of the mobile telephone through the wire 46 and the connector 53. Moreover, the fitting projection 50 provided on the tip of the battery cover 43 is elastically deformed when it is to be inserted into the fitting hole 47. After the insertion, an engagement click provided upward on the tip of the fitting projection 50 catches in the internal wall surface of the rear case on the upper side of the fitting hole 47. Moreover, a pair of ribs 54 provided on the back face of the rear edge portion of the battery cover 43 are engaged with the second engagement projections 49.

However, the conventional internal battery holding structure described above has the following problems (1) to (3).

(1) Since it is necessary to connect the wire 46 of the internal battery 42 to the connector 53, the attachment takes a great deal of time and labor. Moreover, when the internal battery 42 is to be taken out, it is necessary to remove the wire 46 and a great deal of time and labor is similarly taken.

(2) The internal battery 42 is only held by the internal face of the battery cover 43 and is not held in the rear case 41 by itself. Therefore, when the batter cover 43 slips off due to a shock such as a drop, the internal battery 42 also jumps out of the battery housing portion 44 so that an appearance is deteriorated. In that case, moreover, if the wire 46 slips out of the connector 53, a power source is turned off. Furthermore, there is a possibility that the wire 46 might be cut or the connector 53 might be broken.

(3) Since the shock of the internal battery 42 is directly transmitted to the battery cover 43, the battery cover 43 is easily broken.

In consideration of such problems, the present invention has been made and has an object to provide an internal battery holding structure in mobile equipment in which an internal battery can be attached and removed easily and does not jump out even if a battery cover slips off due to a shock such as a drop.

DISCLOSURE OF INVENTION

The present invention provides an internal battery holding structure in mobile equipment comprising a case having a battery housing portion, an internal battery to be accommodated in the battery housing portion and a battery cover to be attached to cover the battery housing portion, wherein the internal battery is formed to have a shape of an almost rectangular parallelepiped, has an electrode terminal provided on one of ends in a vertical direction thereof and has an engagement projection provided on the other end in the vertical direction, the battery housing portion is concaved to have the shape of the almost rectangular parallelepiped in the case, has a pressing connector provided on one of ends in a vertical direction thereof and has, on the other end in the vertical direction, a battery hook for pressing the engagement projection interlockingly with a sliding operation from a release position to a lock position, and the battery hook is slid from the release position to the lock position to press the engagement projection, thereby causing the electrode terminal to abut on the pressing connector and fixing the internal battery to the battery housing portion. By such a structure, the electrode terminal of the internal battery is pressed against the pressing connector so that electrical connection can be obtained. Therefore, the internal battery can be attached and removed easily. Moreover, the internal battery can be held by one of the ends in the vertical direction of the battery housing portion and the battery hook. Therefore, it is possible to prevent the internal battery from jumping out even if the battery cover slips off due to a shock such as a drop.

BEST MODE FOR CARRYING OUT THE INVENTION

An embodiment of the invention will be described below in detail with reference to the drawings.

Figure 1:
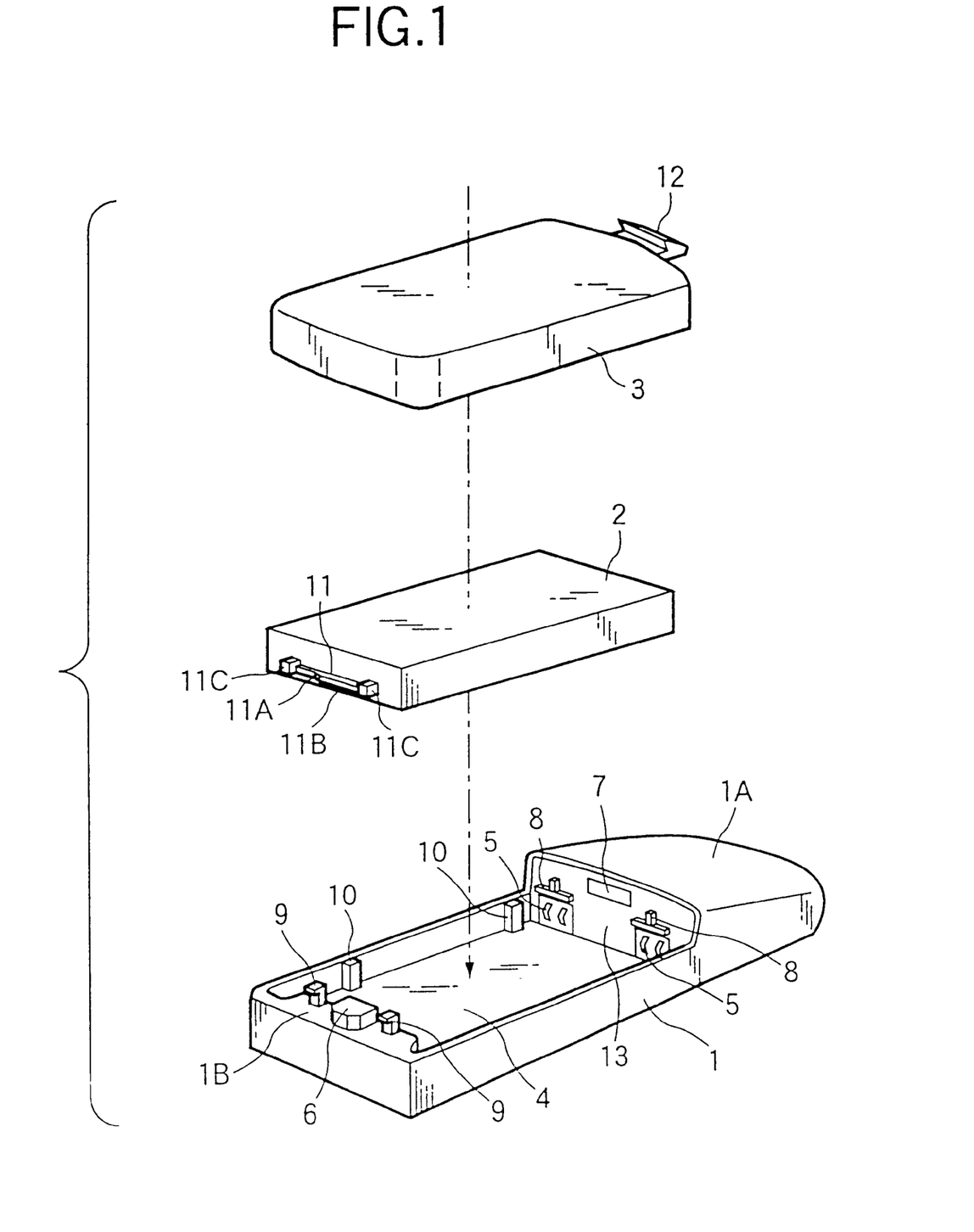
FIG. 1 is a perspective view schematically showing an internal battery holding structure according to an embodiment of the invention.

FIG. 1 is a perspective view schematically showing an internal battery holding structure according to the embodiment of the invention. As shown in FIG. 1, an internal battery 2 is accommodated in a battery housing portion 4 concaved on a rear case 1 of a mobile telephone, and a battery cover 3 is then attached to the rear case 1 from above. Thus, the internal battery 2 is built in the mobile telephone.

The battery housing portion 4 is concaved to have the shape of an almost rectangular parallelepiped over the surface of the rear case 1. An internal wall surface on the front end is provided with a pair of connectors 5, a rectangular fitting hole 7 and a pair of first engagement projections 8. A pair of connector terminals are exposed to the surfaces of the connectors 5. The first engagement projection 8 is protruded in an inverted T shape from the internal wall surface of the front end. Moreover, a rear edge portion 1B of the rear case 1 is provided with a battery hook 6 and a pair of second engagement projections 9. The battery hook 6 can be slid in a transverse direction between a release position and a lock position along the surface of the rear edge portion 1B of the rear case. In the drawing, the release position is set on the oblique upper left side and the lock position is set on the oblique lower right side. The second engagement projection 9 is erected in an inverted L shape from the surface of the rear edge portion 1B of the rear case.

Figure 2:
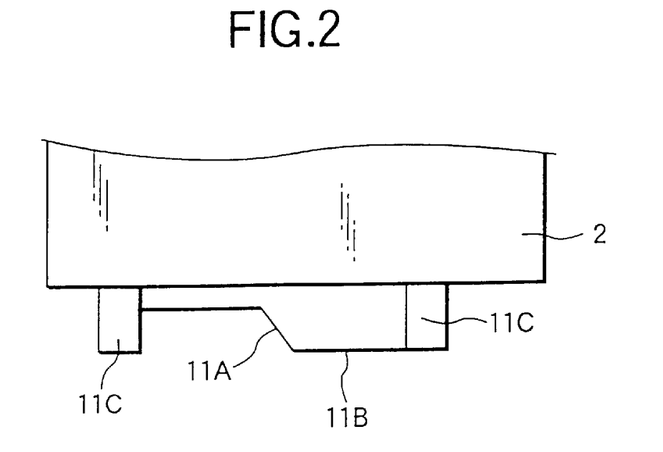
FIG. 2 is an enlarged plan view showing a third engagement projection illustrated in FIG. 1.

The internal battery 2 has the external shape of an almost rectangular parallelepiped. A third engagement projection 11 is provided on a rear end face. As shown in an enlarged plan view of FIG. 2, the third engagement projection 11 has a taper face 11A protruded in a vertical direction from the rear end face of the internal battery 2, a flat face 11B connected to a tip thereof, and a fitting portion 11C provided on both side ends.

A fitting projection 12 is provided on the front end of the battery cover 3. Moreover, the back face of the rear edge portion is provided with a rib capable of sliding the battery hook 6 during attachment to the rear case 1, which is not shown. The fitting projection 12 is protruded forward from the front end of the battery cover 3 and an upward bent engagement click is provided on a tip thereof. Moreover, a pair of notches to be engaged with the first engagement projections 8 are provided on the back face of the front edge of the battery cover 3, which is not shown.

Figure 3A:
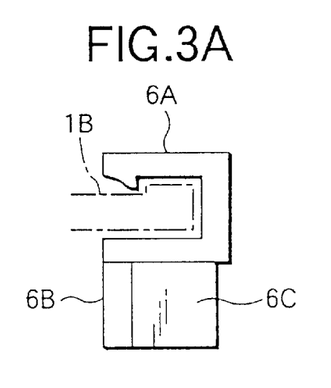
FIGS. 3A–3C are a view showing a structure of a battery hook illustrated in FIG. 1.
Figure 3B:
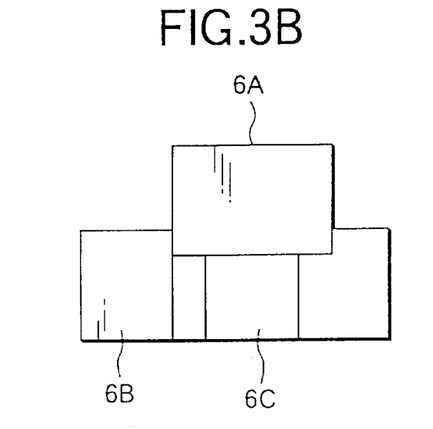
Figure 3C:
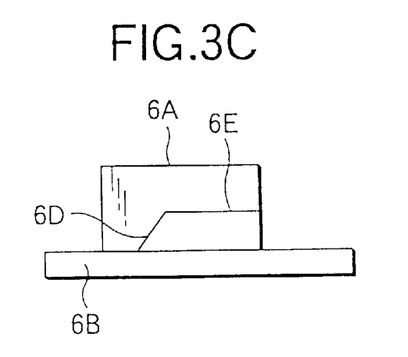

FIGS. 3A to 3C show the structure of the battery hook 6: FIG. 3A is a side view, FIG. 3B is a front view, and FIG. 3C is a bottom view. The battery hook 6 has a guide portion 6A in an upper part and has a base 6B and a projection 6C in a lower part. The guide portion 6A is constituted to have a side surface taking an almost horseshoe shape such that the front end of the rear edge portion 1B of the rear case is interposed between the surface and the back. A portion positioned on the upper side of the rear edge portion 1B of the rear case is formed to have a hexagonal prism having two adjacent rounded corners of the almost rectangular parallelepiped as shown in FIG. 1. Moreover, the oblong plate-shaped base 6B and the projection 6C protruded from the front face side of the plate-shaped base 6B are provided integrally in a portion positioned on the lower side of the rear edge portion 1B of the rear case. The projection 6C has a taper face 6D and a flat face 6E connected to a tip thereof.

Description will be given to the procedure for accommodating the internal battery 2 in the battery housing portion 4 and attaching the battery cover 3 and the operation of each portion which is to be carried out at that time in the mobile telephone having the structure described above.

Figure 4A:
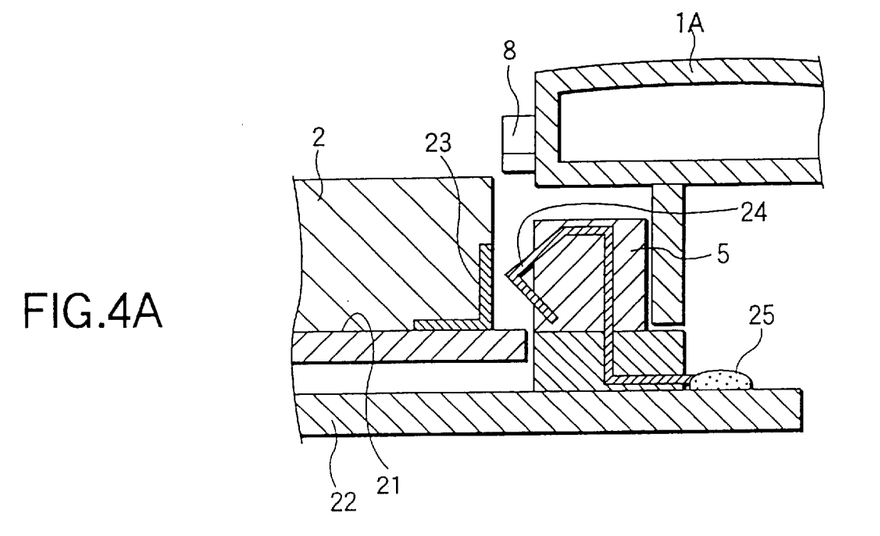
FIGS. 4A–4C are a sectional view showing the vicinity of a tip of a battery housing portion during attachment of an internal battery.
Figure 5A:
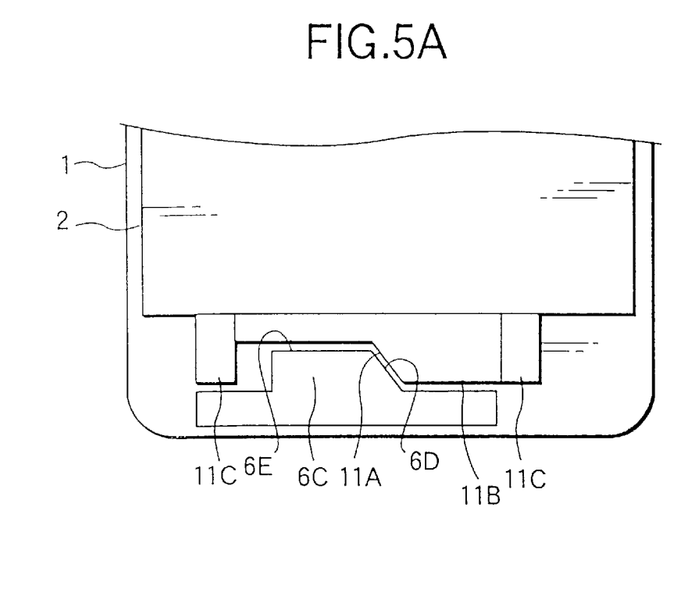
FIGS. 5A–5B are a view showing the positional relationship between the third engagement projection and the battery hook during the attachment of the internal battery.

First of all, the internal battery 2 is put in the battery housing portion 4. The inside diameter of the battery housing portion 4 is slightly larger than the outside diameter of the internal battery 2. Therefore, the internal battery 2 can be accommodated easily in the battery housing portion 4. FIG. 4A is a sectional view showing the vicinity of the tip of the battery housing portion 4 in a state which is obtained at this time. Moreover, FIG. 5A is a view showing the positional relationship between the engagement projection 11 and the battery hook 6 which is obtained at this time.

As shown in FIG. 4A, a battery terminal 23 is provided on the tip of the internal battery 2. The battery terminal 23 is obtained by bending a thin and slender metal plate to have an almost L shape. Moreover, a connector terminal 24 is protruded from a face of the connector 5 which is opposed to the battery terminal 23. In the same manner as the battery terminal 23, the connector terminal 24 is obtained by bending a metal plate and an end opposite to a portion opposed to the battery terminal 23 is bonded to a terminal (not shown) on a printed circuit board 22 through a solder 25. In this state, the battery terminal 23 is not in contact with the connector terminal 24. As shown in FIG. 5A, at this time, the battery hook 6 is present in the release position and the tip 6E of the projection 6C of the battery hook 6 and the tip 11B of the third projection 11 are shifted in a transverse direction.

Figure 4B:
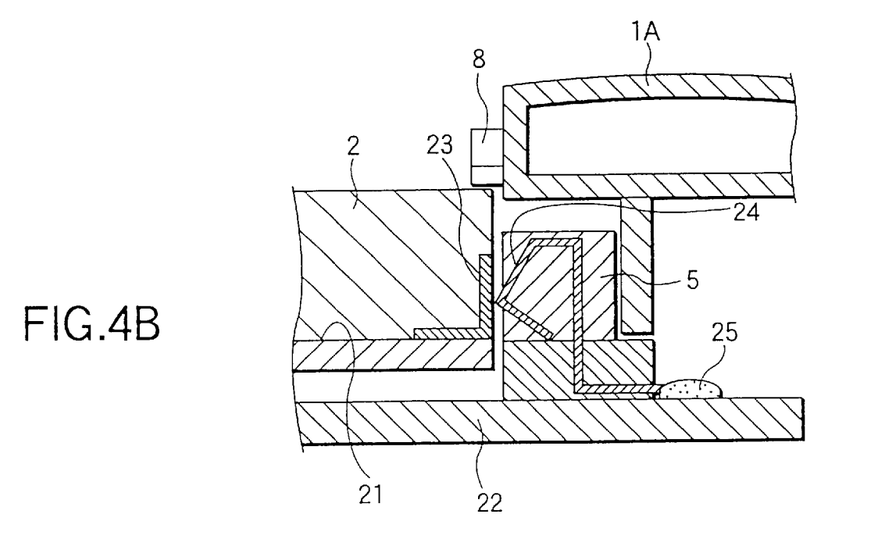
Figure 4C:
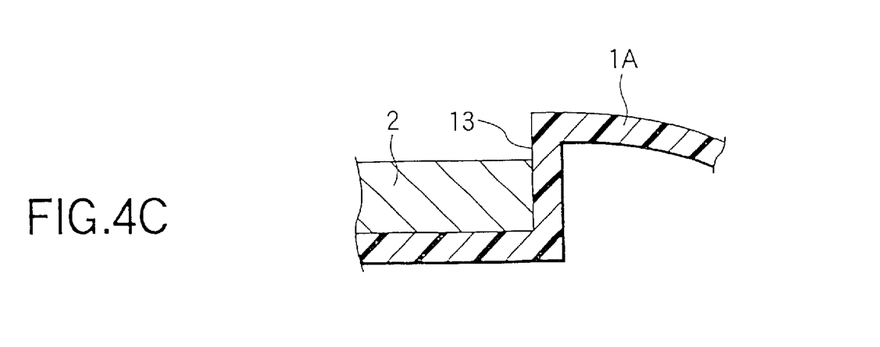
Figure 5B:
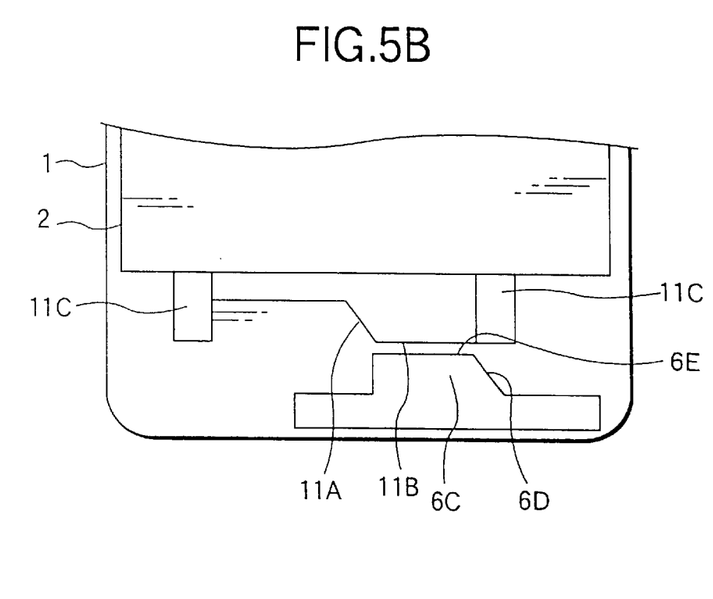

Next, the battery hook 6 is slid to the lock position. More specifically, the guide portion 6A of the battery hook 6 is slid in an oblique lower right direction of FIG. 1. Consequently, the positional relationship between the engagement projection 11 and the battery hook 6 is obtained as shown in FIG. 5B. In other words, when the battery hook 6 is moved from the position of FIG. 5A in a right direction, the taper face 11A of the third engagement projection 11 gets over the taper face 6D of the battery hook 6 and then gets on the flat face 6E connected to the tip of the taper face 6D. As a result, the flat faces 6E and 11B on the tips of the mutual projections abut. In this process, the internal battery 2 is slid in the direction of the tip of the battery housing portion 4 and the battery terminal 23 provided on the tip of the internal battery 2 presses the connector terminal 24. As shown in FIG. 4B, consequently, the connector terminal 24 is pressed by the battery terminal 23 and is thereby deformed elastically, and is pressed into a housing of the connector 5. As a result, the battery terminal 23 and the connector terminal 24 are held in a contact state by the elastic force of the connector terminal 24.

Figure 6:
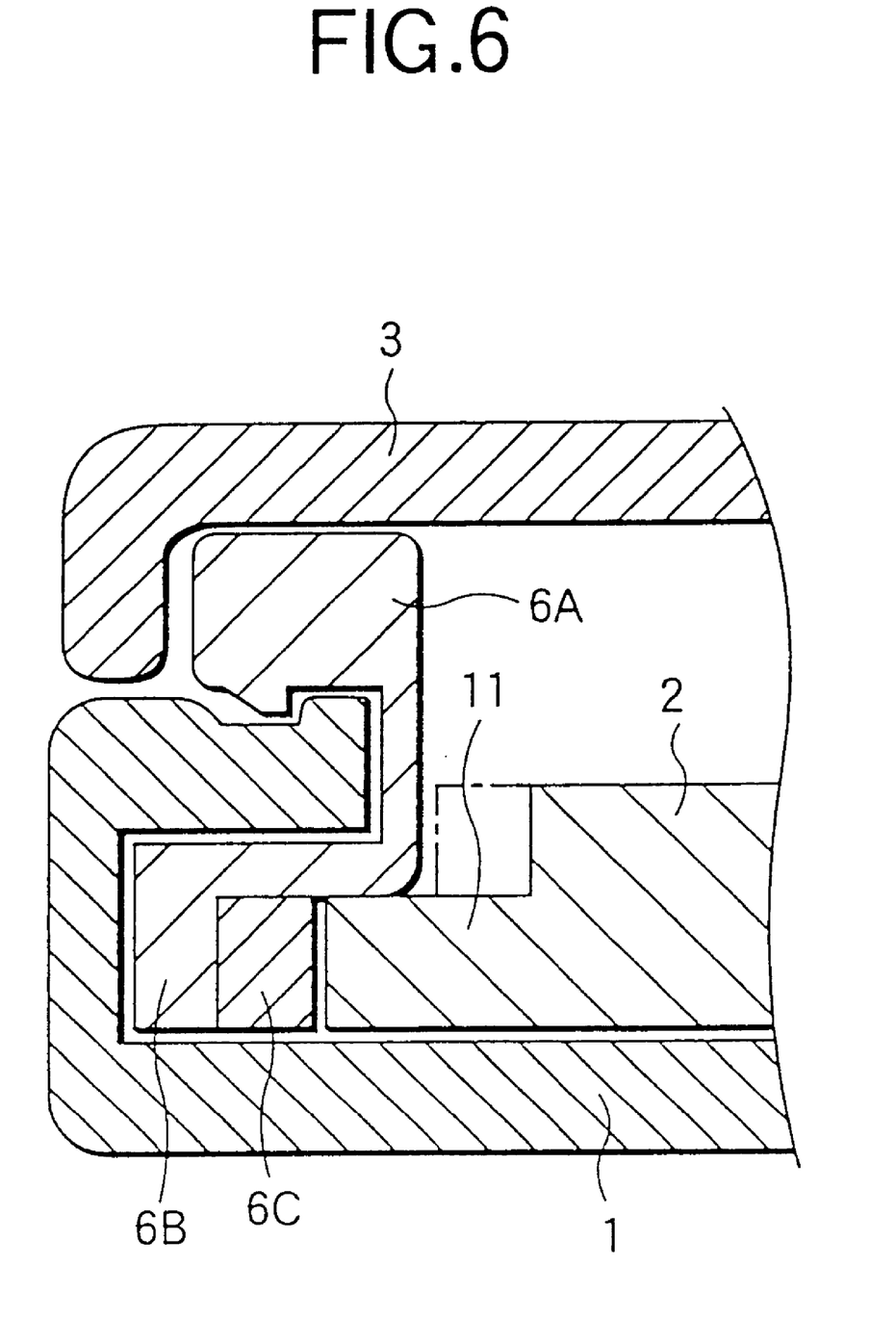
FIG. 6 is a sectional view showing the vicinity of a rear edge portion of a rear case in a state which is obtained after a battery cover is attached.

In such a state that the battery hook 6 is slid to the lock position, moreover, the internal battery 2 is held through the first engagement projection 8 of the rear case 1 on a front portion in a height direction and through the battery hook 6 or the rear case 1 on a rear portion in the height direction (FIGS. 4A and 6). Furthermore, the internal battery 2 is held through the rib 10 provided in the rear case 1 and the external shape of the internal battery 2 in a transverse direction. In a vertical direction, the internal battery 2 is held through a fitting face 13 provided in the rear case 1 on the front portion and through the battery hook 6 on the rear portion.

Although both the projection 6C of the battery hook 6 and the third engagement projection 11 have the taper faces in the above description, the taper face may be provided on at least one of them.

Next, the battery cover 3 is mounted and slid forward with the battery housing portion 4 of the rear case 1 on the upper side. Thus, the battery cover 3 can be attached to the rear case 1. FIG. 6 is a sectional view showing the vicinity of the rear edge portion 1B of the rear case which is obtained after the battery cover 3 is attached to the rear case 1. Since the structure in which the battery cover 3 is held in the rear case 1 is the same as that in the conventional example shown in FIG. 9, description will be omitted.

Figure 7A:
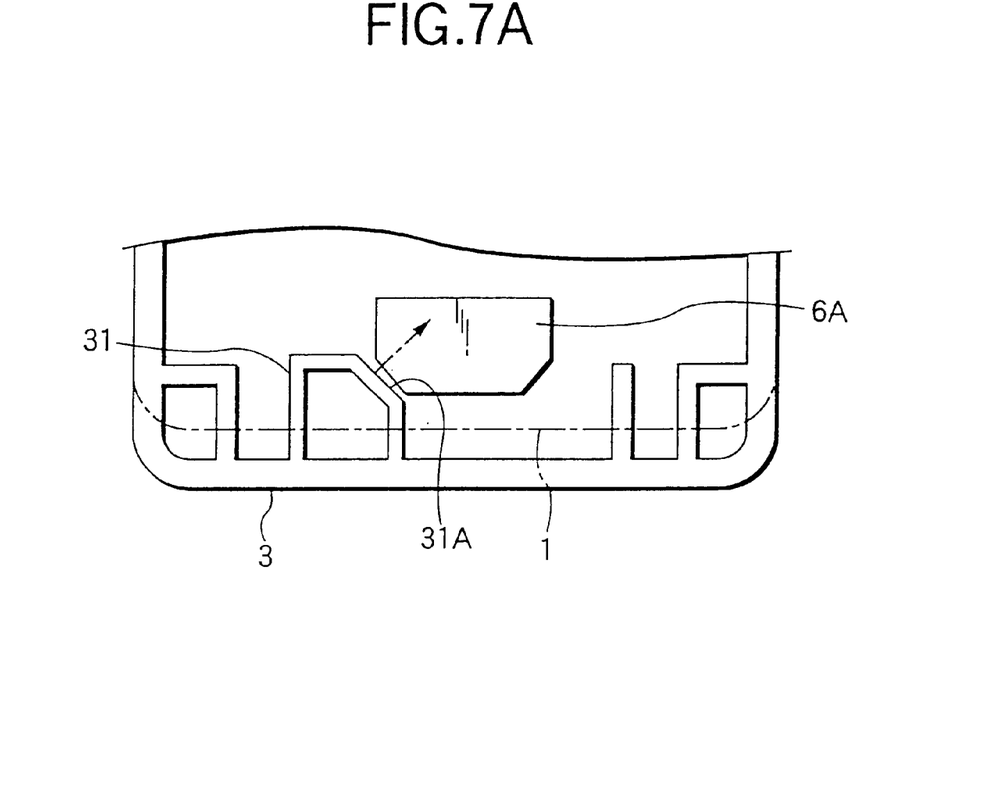
FIGS. 7A–7B are a view illustrating the positional relationship between a rear edge portion of the battery cover and the battery hook which is obtained when the battery hook is to be slid through the battery cover.
Figure 7B:
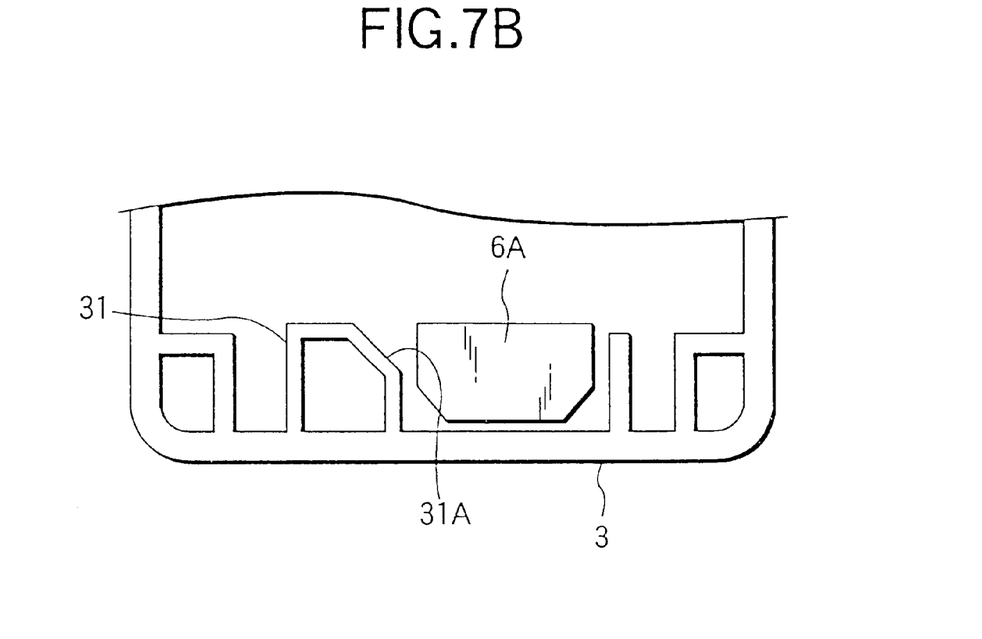

In the above description, a user manually slides the battery hook from the release position to the lock position before attaching the battery cover 3. At this time, the sliding operation is not sufficient. Therefore, there is a possibility that the battery hook 6 might not reach the lock position. In the embodiment, also in that case and in the case in which the battery hook 6 is present in the release position, the battery hook 6 can be slid to the lock position and can be held therein interlockingly with the sliding operation of the battery cover 3. In the following, description will be given, with reference to FIG. 7, to the operation for sliding the battery hook 6 to the lock position and holding the same therein interlockingly with the sliding operation of the battery cover 3 from the state in which the battery hook 6 is present in the release position.

FIG. 7 is a view illustrating the positional relationship between the rear edge portion of the battery cover 3 and the battery hook 6 which is obtained when the operation is to be carried out, which is seen from the upper side of the battery cover 3. The internal face of the rear edge portion of the battery cover 3 is provided with a rib 31 capable of pressing and holding the guide portion 6A of the battery hook 6. The rib 31 includes a taper face 31A, and the guide portion 6A of the battery hook 6 is present in the release position in a state in which the battery cover 3 has not been slid forward as shown in FIG. 7A. Next, when the battery cover 3 is slid forward (upward in the drawing), the taper face 31A of the rib 31 presses the taper face of the left rear edge portion of the guide portion 6A. Accordingly, the guide portion 6A receives force in a direction shown in an arrow of FIG. 7A. As a result, the guide portion 6A is slid in a left direction. When the fitting projection 12 provided on the tip of the battery cover 3 is inserted and held in the fitting hole 7, the guide portion 6A reaches the lock position to be accommodated on the right side of the rib 31 as shown in FIG. 7B.

As described above, according to the internal battery holding structure in accordance with the embodiment of the invention, the battery terminal 23 of the internal battery 2 has such a structure as to be pressed in contact with the connector terminal 24 of the connector 5. Therefore, it is not necessary to connect or remove a wire when attaching or removing the internal battery.

Moreover, the position of the rear end of the internal battery 2 is controlled by the projection 6C of the battery hook 6, the position of the tip is controlled by the internal wall surface of the tip of the battery housing portion 4, and the position of the upper edge of the tip is controlled by the lower end of the first engagement projection. Therefore, it is possible to prevent the internal battery 2 from jumping out even if the battery cover 3 slips off due to a shock such as a drop.

Furthermore, even if external force for sliding the battery hook 6 in a release direction is applied due to a shock such as a drop, the rib 31 of the battery cover 3 acts as a stopper. Therefore, there is a low possibility that the internal battery 2 might slip off from the rear case 1.

Moreover, the internal battery 2 is positioned by only the rear case 1 and the battery hook 6. Therefore, there is no possibility that the internal battery 2 might be broken by external force.

Also in the case in which the internal battery 2 and the battery hook 6 are not fixed into a normal condition, they can be automatically slid and held in the normal condition interlockingly with the sliding operation of the battery cover 3. Therefore, even if the operation for the internal battery 2 and the battery hook 6 is inaccurate, they can be attached correctly.

INDUSTRIAL APPLICABILITY

As described above, according to the invention, the battery hook is slid from the release position to the lock position to press the internal battery. Consequently, the electrode terminal is caused to abut on the pressing connector and the internal battery is fixed to the battery housing portion. Therefore, the internal battery can be attached and removed easily. Moreover, the internal battery can be held by the pressing connector provided on one of the ends in the vertical direction of the battery housing portion and the battery hook provided on the other end in the vertical direction. Therefore, it is possible to prevent the internal battery from jumping out even if the battery cover slips off due to a shock such as a drop.

What is claimed is:

1. An internal battery holding structure in mobile equipment comprising:

a case having a battery housing portion;

an internal battery to be accommodated in the battery housing portion; and a battery cover to be attached to cover the battery housing portion, wherein the internal battery is formed to have a shape of an almost rectangular parallelepiped, includes: an electrode terminal provided on one of ends in a vertical direction thereof; and an engagement projection provided on the other end in the vertical direction, wherein the battery housing portion is concaved to have the shape of the almost rectangular parallelepiped in the case, includes: a pressing connector provided on one of ends in a vertical direction thereof; and a battery hook for pressing the engagement projection interlockingly with a sliding operation from a release position to a lock position on the other end in the vertical direction, whereby the electrode terminal to abut on the pressing connector and fixing the internal battery to the battery housing portion by sliding the battery hook from the release position to the lock position to press the engagement projection.

2. An internal battery holding structure in mobile equipment according to claim 1, wherein the engagement projection has a taper face in the vertical direction, and the taper face is pressed by the sliding operation of the battery hook, whereby the internal battery is slid in the vertical direction.

3. An internal battery holding structure in mobile equipment according to claim 2, wherein a flat face is formed on a tip of the taper face and the battery hook abuts on the flat face in the lock position thereof.

4. An internal battery holding structure in mobile equipment according to claim 1, wherein the battery hook has a second taper face in the vertical direction, wherein the engagement projection is pressed by the second taper face during the sliding operation whereby the internal battery is slid in the vertical direction.

5. An internal battery holding structure in mobile equipment according to claim 4, wherein a second flat face is formed on the tip of the second taper face and abuts on the engagement projection with the battery hook set in the lock position.

6. An internal battery holding structure in mobile equipment according to claim 1, wherein the battery cover slides the battery hook and holds the battery hook in the lock position thereof by an attachment operation.

* * * * *

UNITED STATES PATENT AND TRADEMARK OFFICE
CERTIFICATE OF CORRECTION

PATENT NO. : 6,515,450 B1
DATED : February 4, 2003
INVENTOR(S) : Takashi Kaiho et al.

It is certified that error appears in the above-identified patent and that said Letters Patent is hereby corrected as shown below:

<u>Title page,</u>
Item [30], Foreign Application Priority Data, please delete "Mar.", and insert -- therefor -- Apr. --.

Signed and Sealed this

Twenty-ninth Day of July, 2003

JAMES E. ROGAN
*Director of the United States Patent and Trademark Office*